(12) United States Patent
Nasser

(10) Patent No.: US 8,189,875 B2
(45) Date of Patent: May 29, 2012

(54) SYSTEMS AND METHODS FOR GEMSTONE IDENTIFICATION AND ANALYSIS

(75) Inventor: Gabriel G. Nasser, Dubai (AE)

(73) Assignee: TJS DMCC, Dubai (AE)

( * ) Notice: Subject to any disclaimer, the term of this patent is extended or adjusted under 35 U.S.C. 154(b) by 705 days.

(21) Appl. No.: 12/415,529

(22) Filed: Mar. 31, 2009

(65) Prior Publication Data
US 2009/0245623 A1    Oct. 1, 2009

Related U.S. Application Data

(60) Provisional application No. 61/040,848, filed on Mar. 31, 2008.

(51) Int. Cl.
*G06K 9/00* (2006.01)

(52) U.S. Cl. ........ 382/109; 382/199; 382/203; 382/206; 382/286

(58) Field of Classification Search .......... 382/109, 382/199, 203, 206, 286
See application file for complete search history.

(56) References Cited

U.S. PATENT DOCUMENTS

| | | | |
|---|---|---|---|
| 4,210,027 A | | 7/1980 | Patterson |
| 4,845,646 A | | 7/1989 | Marquis et al. |
| 5,129,268 A | * | 7/1992 | Uesugi et al. ............... 73/865.5 |
| 6,239,867 B1 | | 5/2001 | Aggarwal |
| 6,304,853 B1 | * | 10/2001 | Malnekoff ................... 705/27.1 |
| 2008/0192987 A1 | * | 8/2008 | Helgason et al. ............. 382/109 |

OTHER PUBLICATIONS

International Search Report and Written Opinion for PCT/IB2009/005395 completion date of Sep. 22, 2009 (10 pages).

* cited by examiner

*Primary Examiner* — John Strege
(74) *Attorney, Agent, or Firm* — Goodwin Procter LLP

(57) ABSTRACT

Images of items of jewelry having gemstones embedded therein are imaged and analyzed to determine the weights associated with the gemstones and, separately the precious metal in which the gemstones are encased without having to remove the gemstones from the jewelry.

16 Claims, 9 Drawing Sheets

SYSTEMS AND METHODS FOR GEMSTONE IDENTIFICATION AND ANALYSIS

CROSS-REFERENCE TO RELATED APPLICATIONS

This application claims priority to and the benefits of U.S. provisional patent application Ser. No. 61/040,848, entitled "Systems And Methods For Gemstone Identification and Analysis" and filed Mar. 31, 2008, the entire disclosure of which is incorporated herein by reference.

FIELD OF THE INVENTION

The invention relates generally to systems and techniques for measuring the weights associated with gemstones embedded within jewelry items without having to remove the gemstones or causing harm to the items.

BACKGROUND

Producing, trading and selling jewelry containing precious metal requires significant investment of capital largely due to the high value of the metal itself. For example, the financing inventory of gold jewelry typically is given in the form of a gold loan, granted by a financial institution such as a bank to a retailer or a wholesaler. However, since the loan is in the form of gold rather than in actual currency value, it presents several problems, such as exposure to the fluctuations in gold prices and a significant capital investment to start a retail establishment, either in purchasing actual stock or providing a cash margin to a bank as collateral for the gold loan.

The effects on the industry can be devastating and, after sharp increases in gold prices in September 1999, May 2006 and February 2008, several small retailers declared bankruptcy and medium-size and larger retailers were forced to reduce their stocks dramatically or close some of their retail locations, or both. Wild and continuous fluctuations in the gold price also have a negative effect. For example, in 2006, and more recently in 2008 there were several spikes of $100 or more.

In one alternative method of financing gold jewelry, the jeweler and a financier enter into a swap transaction, whereby the jeweler passes title of her jewelry to the financier and the financier, in return, provides her with an equivalent value in gold ounces at the then prevailing price of gold. The financier places the swapped gold jewelry, which he now effectively owns, on consignment at the jeweler's retail location. This process, however, requires a very accurate measurement of the amount of gold contained in each piece of jewelry under consignment. In cases where the piece includes many embedded stones, such a determination can be difficult and time consuming.

Conventional methods for accurately capturing the weight of a gemstone (or a collection of gemstones) mounted on an article of jewelry is simply to un-mount the gemstones, weigh the stones on a sufficiently accurate scale, and remount the stones. Clearly, such proposed method suffers from several drawbacks, including potentially inflicting damage to the article and the stone, invalidating the manufacturer's warranty, and being highly labor-intensive and time-consuming. Further, this method becomes completely infeasible when the jewelry article in question contains dozens of mounted gemstones, which is common. In many cases, especially when analyzing jewelry having a significant amount of gold (or other precious metal), knowing the exact weight of the gemstones permits the calculation of the weight of the gold used in the item. Such knowledge is critical, in that much of the precious metal-based jewelry is financed through banks and dealers who based valuation and financing terms on the amount of gold (or other metal) used in the item.

What is needed, therefore, are non-intrusive, accurate methods and supporting systems for rapidly determining the weight attributed to gemstones in an article of jewelry.

SUMMARY OF THE INVENTION

The invention provides systems and methods for determining attributes of items of jewelry, specifically items that include some combination of mounted gemstones and precious metal. More specifically, the disclosed technique uses various imaging modalities (e.g., tomography, CT scanning, PET scanning, digital photography, etc.) to acquire an image (or a series of images) of the item. The images are then analyzed using the methods described herein to determine the weight attributed to the embedded gemstone (or stones) and the precious metal.

Because the items typically include a metallic mounting structure, the image is often incomplete, and may have certain features obfuscated from view. Using the three-dimensional generated image, additional details may be added and/or deduced regarding the size and shape of the gemstones embedded in the item. Once the volume of the gemstones are known, additional characteristics of the gemstones can be used to calculate the overall weight. Such characteristics include, for example, mineral hardness, specific gravity, index of refraction, density, etc. Based on these attributes, the weight of each embedded gemstone can be calculated to a high degree of accuracy. Subtracting this total "gem weight" from the overall weight of the item provides an accurate weight of the remaining metal used to mount the gems, which in many cases is a precious metal. Because the metal may represent a significant portion of the value of the piece, knowing this weight is critical to the pricing and financing of the piece.

Therefore, in a first aspect the invention provides a computer-implemented method for determining precious metal content of an item of jewelry that includes embedded gemstones. The method includes the steps of retrieving an image of the item of jewelry from a stored memory device and executing a programmatic edge detection process on the image determine edges of the gemstones. In some cases, the images may be taken in real time and discarded after use or alternatively stored for subsequent analyses. Based on the determined edges, a shape (or cut) of each of the gemstones is selected, either based on an automated comparison to known edge/shape relationships, or, in some cases, manually. The dimensions of the gem are then determined (including, in some cases, a depth value), and based on the shape and dimensions, the volume for each of the gemstones is determined, and, using a specific gravity associated with each type of gem, the weight of each gem may be calculated. The precious metal content of the item of jewelry is then calculated by subtracting the weight for each of the embedded gemstones from a total weight of the item of jewelry.

In some embodiments, a scale is determined for the image that describes the ratio of absolute distance to pixels within the image. The scale may be determined manually by an operator, or detected programmatically based on an image of an item of known dimensions.

In another aspect, the invention provides a method for determining precious metal content of an item of jewelry having at least one embedded gemstone without removing the gemstone from the item. The method includes generating and/or retrieving a series of images of the item of jewelry from a stored memory device. The series of images may be two-dimensional images obtained from a single (or multiple) three-dimensional images such as a three-dimensional CT scan. A uniform thickness is attributed to each image and an area attributed to the gemstone is determined based on the image and, in some cases, a scaling value. The total volume is calculated for each gemstone by multiplying each determined area by the uniform thickness and summing the volumes. The total weight for the gemstone is calculated by multiplying the total volume by a specific gravity value associated with the gemstone. The precious metal content is then calculated by subtracting the weight from the total weight of the item of jewelry.

In instances in which there are more than one gemstone in the item, the process may be repeated for each gemstone and a total weight for all the gemstones may then be used to calculate the precious metal content.

In another aspect, the invention provides a system for determining the precious metal content of an item of jewelry having gemstones embedded therein. The system includes a memory register for storing an image of the item of jewelry and a processor. The processor is configured to execute a programmatic edge detection process on the image to determine edges of the gemstones and based on the edges, automatically select a shape of each of the gemstones. The processor then determines various dimensions for each of the gemstones and based on the shape and the dimensions calculates a volume for each gem. The weight of each of the gemstones is determined by multiplying the calculated volume by a specific gravity value associated with each of the embedded gemstones. The precious metal content is then calculated by subtracting the weight for each of the embedded gemstones from a total weight of the item of jewelry.

In another aspect, the invention provides a system for determining precious metal content of an item of jewelry having at least one embedded gemstone without removing the gemstone from the item. The system includes a memory register for storing an image of the item of jewelry and a processor. The processor is configured to assign a uniform thickness to each image and calculate an area attributed to each gemstone based on the image and, in some cases, a scaling value. The total volume may then be calculated for each gemstone by multiplying each determined area by the uniform thickness and summing the volumes. The processor then calculates the total weight for the gemstone by multiplying the total volume by a specific gravity value associated with the gemstone. The precious metal content may then be calculated by subtracting the weight for each of the embedded gemstones from a total weight of the item of jewelry.

In some embodiments, the system may also include a display for displaying the image(s), weights and/or the various values calculated by the processor. In some implementations, the system also includes an imaging device (e.g., a CT scanner, a digital camera, or other such device) to capture the image of the item of jewelry.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
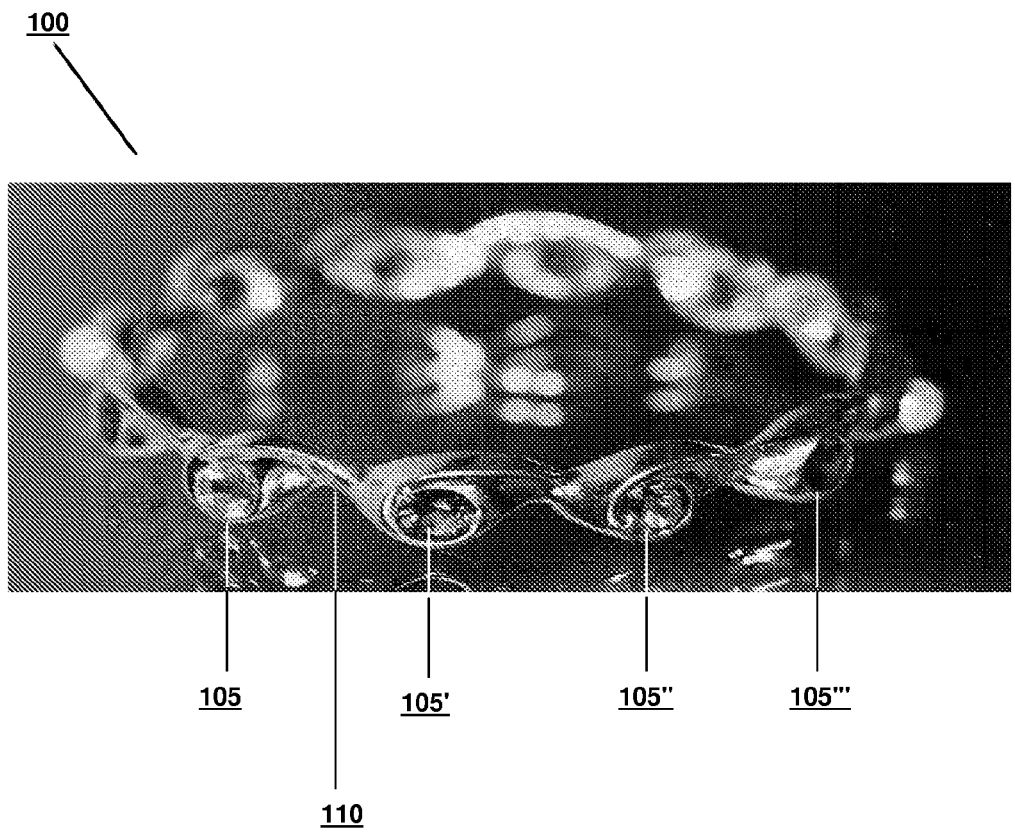
FIG. 1 is an image of an article of jewelry including multiple embedded gemstones that may be analyzed using various embodiments of the invention.

Referring to FIG. 1, an item of jewelry 100 may include one or more gemstones 105, 105', 105", and 105''' (generally, 105) embedded within a precious metal portion of the item 100. The gemstones 105 may be a common stone (e.g., all diamonds), or be various stones. Similarly, the precious metal portion 110 may be homogenous (e.g., all gold) or mixed. In each case, however, it is often necessary to determine the proportion of the overall weight of the item that is attributed to the precious metal in order to accurately value the item 100. While this process may be done easily immediately before or as the item 100 is being crafted, once the item is in the marketplace such a determination becomes difficult. The item of jewelry may be of any shape, size and value, including bracelets, rings, necklaces and broaches that may include any number of embedded gems of varying value and physical characteristics.

For example, one method for distinguishing the portion of the weight attributed to the gemstones from that of the gold is to remove the gemstones, weigh the piece, and replace the stones. This approach, while accurate, is extremely time consuming and risks damage to the piece and loss or replacement of the original gems with less valuable gems. Instead, embodiments of the invention provide various techniques and systems that facilitate the quick and accurate determination of the weight allocated to the gold (or other precious metal) that does not require removal of the gems.

Figure 2:
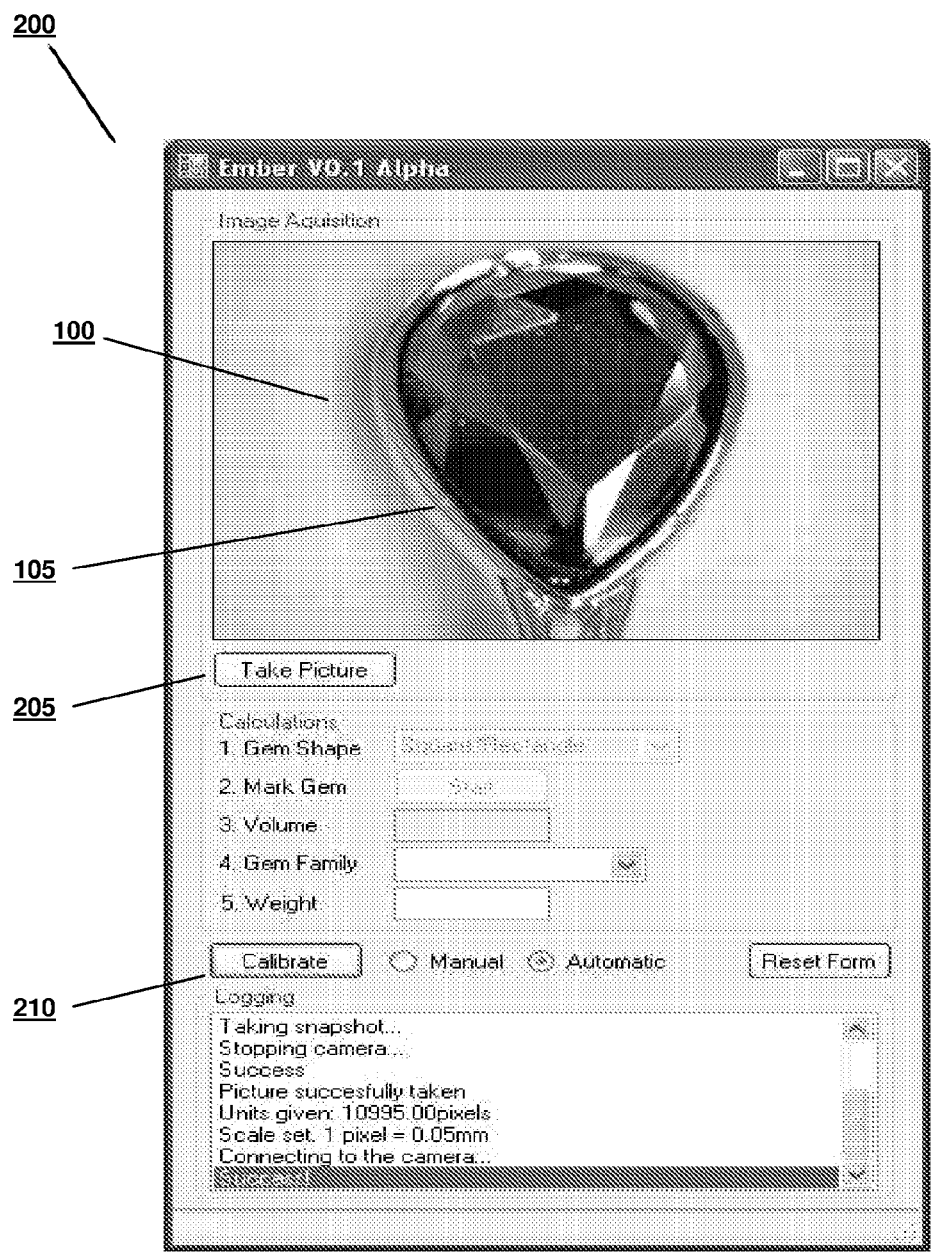
FIG. 2 is a screen capture from a computer application used to capture and process images of gemstones according to various embodiments of the invention.

Referring to FIG. 2, a gemstone analysis application may be used to capture an image of the item and calculate the gemstone and precious metal weight of the item. Screen image 200 illustrates a portion of the item 100 that includes a single gemstone 105. An image of the item is captured by, for example, placing the gemstone in front of a camera and selecting the "Take Picture" button 205. The image may be taken using a commercially-available digital camera connected to or in communication with a computer on which the gemstone analysis application operates. The image may be stored in volatile memory of the computer (e.g., RAM), the camera (e.g., a flash card) or on an optical or magnetic drive. In some cases, the image may be delivered on disk or flash memory device along with the item, or in other implementations downloaded from a website operated by the owner of the item. In each case, the image of the item is captured and presented to the operator.

In some embodiments, the operator calibrates a base scale for each session to determine a distance measure attributed to each pixel in the image by clicking on a "Calibrate" button 210. Various methods of scale detection may be used. In one example, automatic scale detection uses a picture of a black square (or other easily definable shape, often referred to as a "phantom") of known dimensions, such as 2 cm×2 cm. Based on a stored or newly acquired image of the phantom, the operator provides its dimensions. Using conventional pixel counting techniques, the application automatically calculates a scale ratio. For example, if the edge of the phantom is known to be 2 cm and the image of that edge includes 200 pixels, the base scale ratio is 100 (200/2). In other instances, manual calibration may be used. In such cases, the operator takes an image of an object of known dimensions. The operator then marks an edge of the object on the screen (using a mouse or other pointing device) the length of that edge is entered. Once that is done, the scale is detected automatically using pixel counting techniques. The user then places the target gemstone in view of the camera and takes a snapshot.

Figure 3:
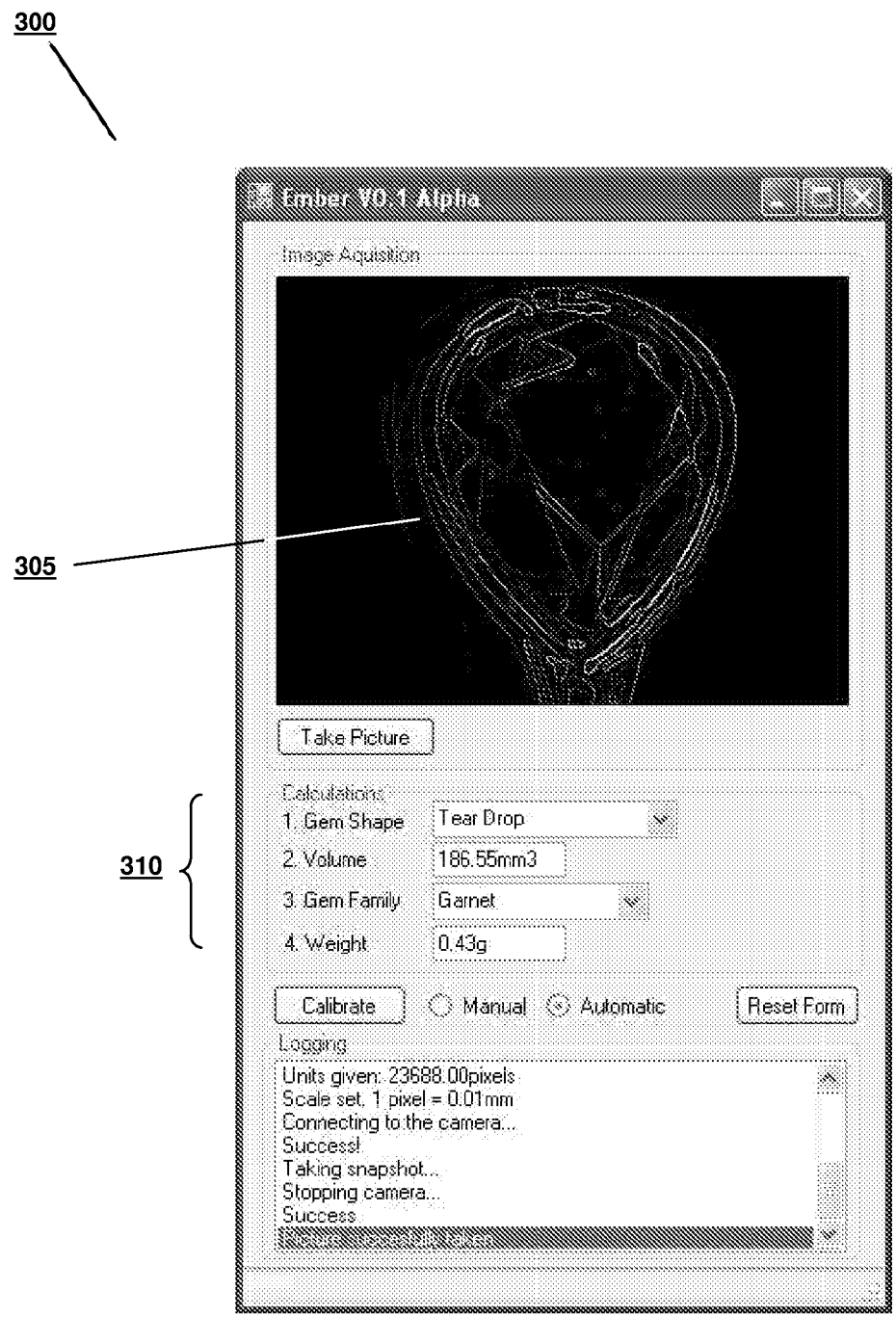
FIG. 3 is another screen capture from an application used to capture and process images of gemstones according to various embodiments of the invention.

Referring now to FIG. 3, screen capture 300 illustrates one embodiment of an application screen for analyzing the gemstone. Using the captured image and known image recognition algorithms, various edges of the gem are detected in the image. As a result, an edge image 305 is presented to the operator illustrating where the application believes the edges (or cuts) are on the gemstone. Using this data, the application determines the shape (cut) of the gemstone. For example, the application may use a library of stored references for different gemstone cuts and compare the captured image to the stored references and determine which reference is closest to the captured image. Such a determination may be based, for example, on a distance minimization algorithm that calculates mean-squared distance between edges identified in the captured image and edges in the stored references. Stored references may include images of gemstones of known shapes such as round, princess, emerald, oval, pear, teardrop, marquise, as well as others. Once the shape is detected, it is displayed on the screen (in a gem shape field, for example) for the operator to review. In some cases, the operator may adjust the shape (e.g., change pear to marquise) if she believes the application did not detect the shape properly. In other cases, the operator may be prohibited from changing the shape in order to ensure the she cannot misrepresent the item.

Once the application has identified the edges and shape of the gemstone, the dimensions of the gemstone may be calculated using the base scale calculated above. For example, an emerald-shaped gem may have a vertical edge and a horizontal edge of known pixel lengths in the image. Using the base scale, the actual dimensions of the gem may be calculated. Further, gemstones having certain horizontal and vertical dimensions may be limited to certain known depth dimensions. For example, 1.2 cm×0.5 cm gem may be limited to a depth value between 0.25 and 0.3 cm. In some instances, the permitted depth values may be based on the type of gemstone (e.g., diamonds may have shallower depths due to increased hardness, for example). In other implementations, the depth may be determined in a similar manner as described above using the detected edges and base scale.

Once a set of dimensions has been determined, the application calculates an estimated volume of the gemstone. The estimated weight may be displayed to the operator and, in some cases, adjusted. In most implementations, however, the volume is a secure, non-editable field that cannot be adjusted. Such precautions protect against tampering by operators that may want to overstate the size of the gemstone, thereby reducing the weight attributed to the precious metal used in the item of jewelry.

The operator may then select a gem type or gem family, typically from a drop down list of known gemstones. For example, the operator may know that the gem is a ruby and select "Ruby" from a list of available gemstone types. Using this information, the application can identify a specific gravity value associated with the gem. Multiplying the volume by the specific gravity provides the weight associated with the gemstone.

In some cases, an initial total weight of the item may be acquired prior to analysis. The weight may be known previously (e.g., it may be provided by the wholesaler or dealer) whereas in other cases the retailer or owner of the item may determine the overall weight and/or confirm the weight provided with the item. By subtracting the weight associated with the gemstone from the total weight of the item, and resulting precious metal weight can be determined.

If the item includes more than one gemstone, the above process may be repeated for each gem, and the weights associated with each gem summed to a total gemstone weight, which may then be subtracted from the total weight as described above.

Figure 4:
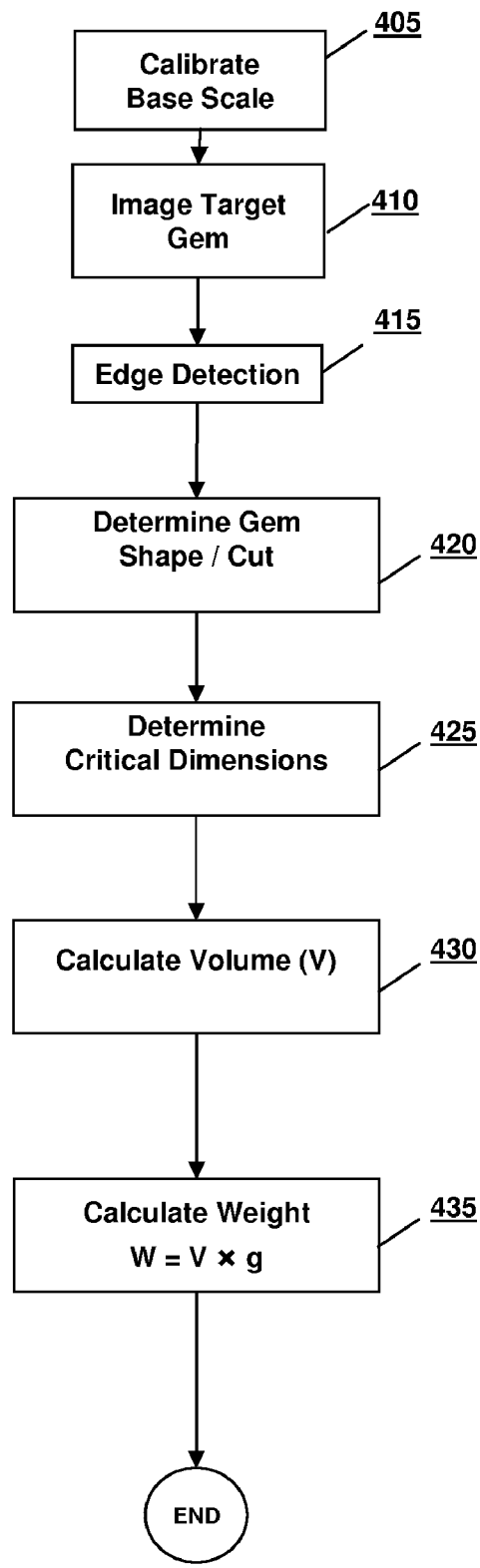
FIG. 4 is a flow chart illustrating steps for calculating weights of gemstones embedded in an article of jewelry according to one embodiment of the invention.

One embodiment of the above-described process is illustrated in FIG. 4. An operator calibrates the system by determining a base scale for the images (STEP 405) and capturing or retrieving an image of the item of jewelry (STEP 410). One or more edge detection algorithms are run on the image (STEP 415) by analyzing pixel gradient values and/or other second-order derivative functions based in intensity and other pixel characteristics. A gem shape or cut is then determined (STEP 420) by analyzing the edges, and based on the shape, certain critical dimensions are measured (STEP 425). Using the measured dimensions, a volume is calculated (STEP 430). Using the volume and a specific gravity associated with the gemstone type, a total weight is calculated (STEP 435). In other implementations, other weight calculation formulae may be used to calculate the weight of the gemstone(s).

Figure 5:
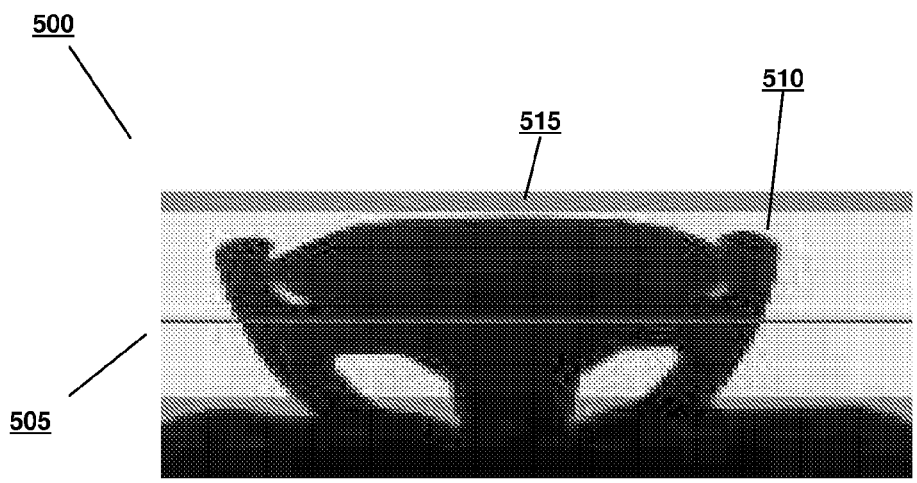
FIG. 5 is an image of an article of jewelry including an axis notation according to one embodiment of the invention.

In another aspect of the invention, a slice-by-slice technique may be used to determine the volume (and therefore the weight) attributed to one or more gemstones embedded in an item of jewelry. Referring to FIG. 5, a series of images 500 are obtained of the item using one or more imaging modalities such as a CT scanner. In some instances, the series of images may be derived from a single three-dimensional image or rendering of the item. In other cases, a the images may be a series of two-dimensional images. In such cases, the scans may represent "slices" of the item taken from one perspective, such as along a single axis, (i.e., all the pixels in one two-dimensional image have one fixed coordinate). In FIG. 5, for example, the x and y coordinates represent two orthogonal directions, which, in the case of an item having the same cross-sectional shape from these two directions may result in similar images. The z coordinate 505 represents the vertical direction, with the origin at the base of the ring and extending upwards to the crown of the gemstone. Of course, any orientation or coordinate system may be used as a reference. By obtaining multiple images, each varying one or more of the coordinates slightly, a three-dimensional representation of the item can be built.

The representation, may, in some cases, be incomplete due to the presence of non-radiolucent metal(s) 510 in the jewelry on which the gemstone 515 is mounted. The metal effectively "shields" the gemstone from the imaging energy and results in missing sections of the representation. One or more known shape reconstruction or restoration algorithms may be used to "fill-in" missing sections of the image, resulting in an accurate image of the item.

Figure 6:
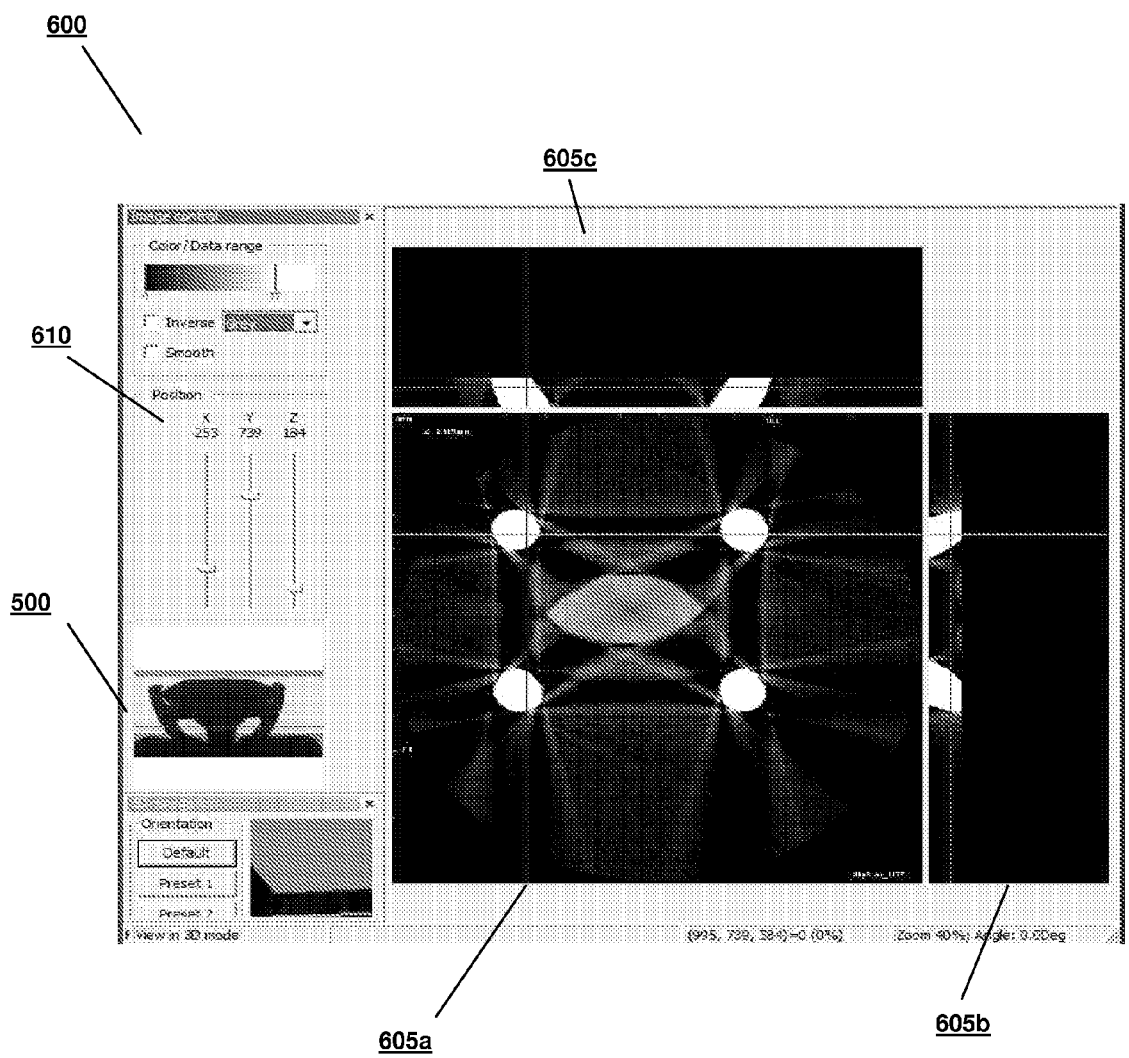
FIG. 6 is a screen capture from a computer application used to analyze articles of jewelry according to one embodiment of the invention.

FIG. 6 is a representative screen 600 from a software application used to display images of the jewelry 500 from each of three perspectives 605a, 605b and 605c. In some instances, the application loads multiple cross-sectional images and allows a user to interactively navigate along one, two or all three axes, thus viewing attributes of the item at different points. In response to user manipulations of the x, y and or z coordinate controls 610 along the left side of the screen, the application presents different images corresponding to the requested coordinates. In some cases, the application presents a sequence of images at a fixed interval (e.g., every second), to simulate travelling along one of the axes.

Depending on the imaging modality, representations of different components of the item under analysis may appear different. In this example, the gemstone embedded in the item appears dark, indicating a translucence, because the energy used to image the item can travel through the gemstone. In cases where the item includes multiple gemstones having different physical characteristics (or a single gemstone has imperfections or is non-uniform) such areas may be represented using coloration or varying degrees of grey-scale. Further, metallic structures of the item (e.g., prongs, settings, bands, etc.) are visually distinguished from the gemstones. In the example, below, the gold prongs are shown as white to contrast with the dark sections representing the gem embedded therein.

Where items include multiple gemstones (see, for example, the bracelet of FIG. 1) the imaging process may be repeated from different perspectives to obtain images for each embedded stone.

Figure 7:
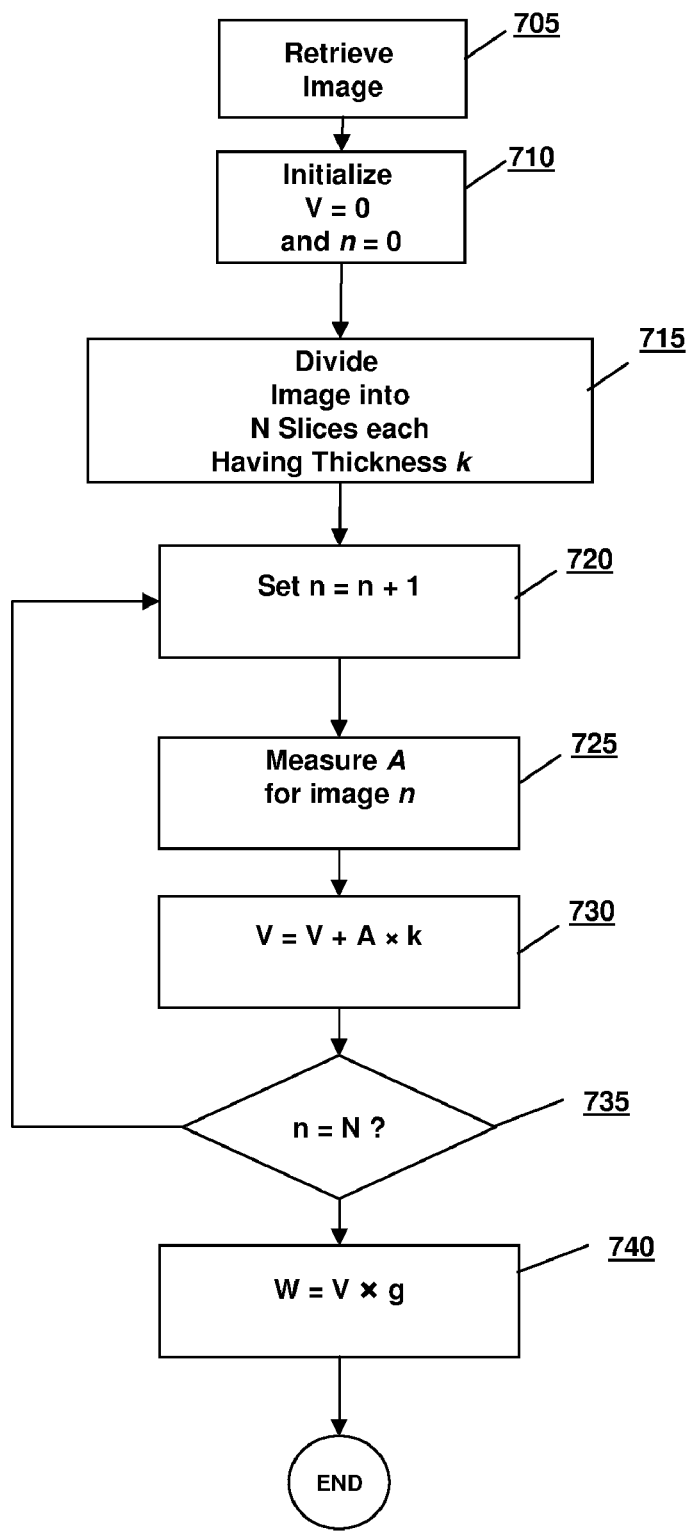
FIG. 7 is a flow chart illustrating steps for calculating the weight of a gemstone embedded in an article of jewelry according to one embodiment of the invention.

Referring to FIG. 7, process 700 may be used to calculate the weight of an embedded gem. An initial image of the item is retrieved from an imaging device or stored memory (STEP 705). As noted above, the image may be a single three-dimensional image or, in some cases, as series of two-dimensional slices. The gemstone volume V and slice number n are initialized at 0 (STEP 710). If the image is a three-dimensional image, the image is divided into N slices, each having a uniform thickness k. (STEP 715). The slice number counter n is then incremented by 1 (STEP 720).

For each of the N images, an area of the gem as seen in the image is measured using the pixel/distance ratio described above (STEP 725) and multiplied by the thickness value k to obtain a slice volume and added to a running volume value V (STEP 730). If the last slice has been analyzed (i.e., if n=N) (DECISION STEP 735) the gemstone weight is calculated by multiplying the total volume V by the specific gravity g for that gem (STEP 740). If n<N, the process repeats for the next slice.

Figure 8:
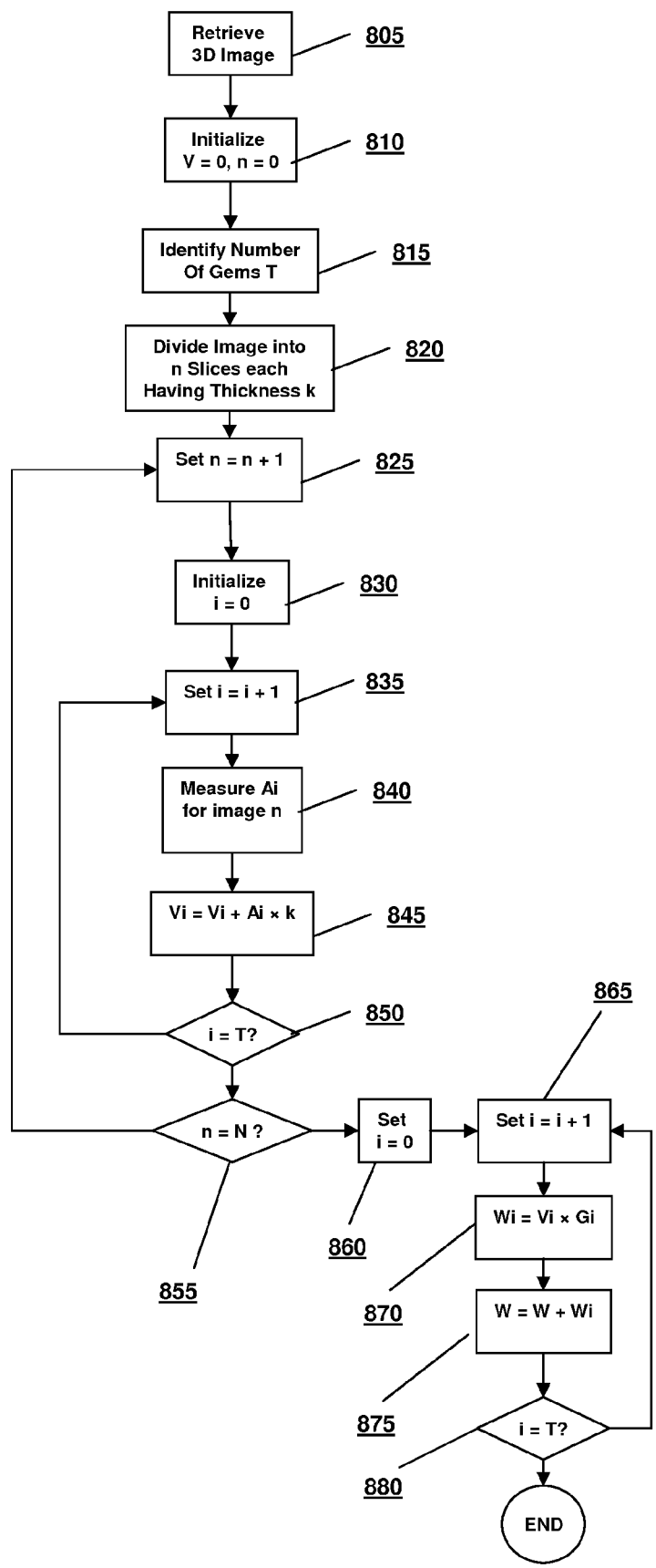
FIG. 8 if a flow chart illustrating steps for calculating the weights of multiple gemstones embedded in an article of jewelry according to one embodiment of the invention.

For pieces of jewelry having more than one embedded stone, the technique is modified slightly. Referring to FIG. 8, process 800 may be used to calculate the weight of multiple embedded gems. An initial image of the item is retrieved from an imaging device or stored memory (STEP 805). As noted above, the image may be a single three-dimensional image or, in some cases, as series of two-dimensional slices. The gemstone volume V and slice number n are initialized at 0 (STEP 810). The number of gems T is identified in the item (STEP 815). If the image is a three-dimensional image, the image is divided into N slices, each having a uniform thickness k. (STEP 820). The slice number counter n is then incremented by 1 (STEP 825) and a gem count i is initiated at 0 (STEP 830).

The gem count is incremented by 1 (STEP 835), and for each image n and gem i the area of the gem as seen in the image is measured using the pixel/distance ratio described above (STEP 840) and multiplied by the thickness value k to obtain a slice volume and added to a running volume value V (STEP 845) for that gemstone. If additional gems are to be measured in the image, the area measurement steps are repeated for each gem in the image (DECISION STEP 850). If not, but there remain additional slices to analyze (DECISION STEP 855) a new image is retrieved and the process is repeated from STEP 825. Once the volumes for each gem in all images have been determined, the gemstone count i is reset to 0 (STEP 860) and incremented by 1 (STEP 865). The weight for each gem is calculated by multiplying the total gem volume for each gem by its associated specific gravity (STEP 870). The individual gemstone weights are summed (STEP 875). If the weights for all gemstones have been accounted for (DECISION STEP 880) the process ends, resulting in a total gemstone weight for the item.

In either case, the total gemstone weight W may then be subtracted from the overall weight of the piece of jewelry (obtained using a sufficiently accurate scale) to obtain the weight of the metal used in the piece. Knowing the weight and purity of the metal, along with a current value (e.g., market or spot price per ounce) permits the calculation of the value of the piece attributed to the metal, and facilitates an accurate pricing for the swap transaction described above.

Figure 9:
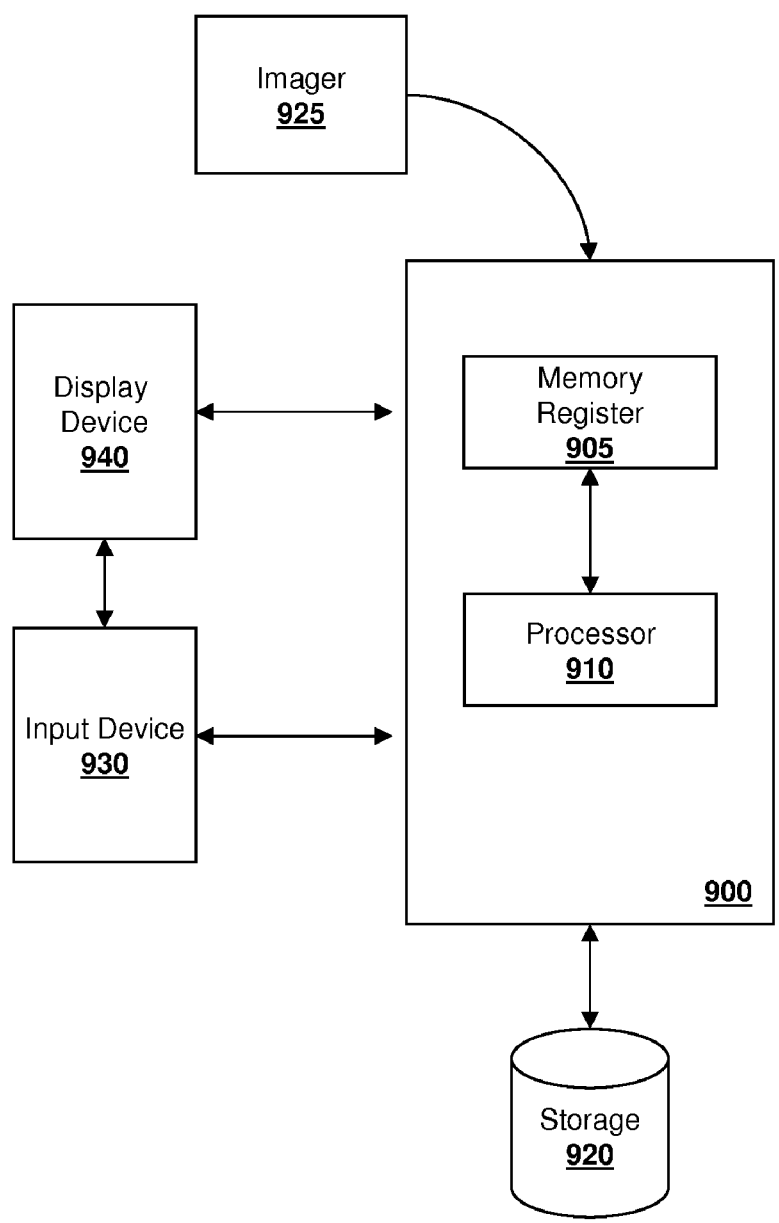
FIG. 9 is a schematic representation of a system in accordance with one embodiment of the invention.

Referring now to FIG. 9, illustrates one embodiment of a computerized system 900 for implementing the techniques described above. The system 900 includes a memory register 905 and a processor 910. The memory register 905 is used to store images of items of jewelry, and provides the images to the processor 910 for further analysis.

The register 909, which may be any suitably organized data storage facility (e.g., partitions in RAM, etc.), stores images from an imager 915 such as an MRI, CT/PET scanner, ultrasound device, digital camera or x-ray device. In some embodiments, the images are stored on a data-storage device 920 separate from the imager (e.g., a database, microfiche, etc.) and sent to the system 900. The register 505 may receive the images through conventional data ports and may also include circuitry for receiving analog image data and analog-to-digital conversion circuitry for digitizing the image data.

In some embodiments, the data storage module 920 may also be used to store the calculated and/or measured weights, specific gravities, and other information used to identify the gemstones and items of jewelry.

The functionality described above may be implemented in hardware or software, or a combination of both on a general-purpose computer. In addition, such a program may set aside portions of a computer's random access memory to provide control logic that affects one or more of the image capture, user input (using, for example, an input device 930) and presentation on a display 940.

The program may be written in any one of a number of high-level languages, such as FORTRAN, PASCAL, C, C++, C#, Java, Tcl, or BASIC or development environments such as Flash, Ruby on Rails, etc. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EEPROM, or CD-ROM.

The invention can be embodied in other specific forms without departing from the spirit or essential characteristics thereof. The foregoing embodiments are therefore to be considered in all respects illustrative rather than limiting on the invention described herein.

The invention claimed is:

1. A computer-implemented method for determining precious metal content of an item of jewelry, the item of jewelry having one or more gemstones embedded therein, the method comprising:
    retrieving an image of the item of jewelry from a stored memory device;
    executing a programmatic edge detection process on the image determine edges of the gemstones;
    based on the determined edges, automatically selecting a shape of each of the gemstones;
    based on the shape and determined edges, calculating a plurality of dimensions for each of the gemstones;
    calculating a volume for each of the gemstones based on the shape and dimensions;
    calculating a weight of each of the embedded gemstones by multiplying the calculated volume by a specific gravity value associated with each of the embedded gemstones; and
    calculating the precious metal content of the item of jewelry by subtracting the weight for each of the embedded gemstones from a total weight of the item of jewelry.

2. The method of claim 1 further comprising determining a scale for the image, wherein the scale describes a ratio of distance to pixels within the image.

3. The method of claim 1 wherein the dimensions include a depth value.

4. A method for determining precious metal content of an item of jewelry, the item of jewelry having a gemstone embedded therein, the system comprising:
    (a) retrieving a series of images of the item of jewelry from a stored memory device;
    (b) attributing a uniform thickness to each image;
    (c) for each image, determining an area attributed to the gemstone;
    (d) calculating a total volume for the gemstone by (i) calculating a volume for each image by multiplying each determined area by the uniform thickness, and (ii) summing the volumes;
    (e) calculating a weight for the gemstone by multiplying the total volume by a specific gravity value associated with the gemstone; and
    (f) calculating the precious metal content of the item of jewelry by subtracting the weight from a total weight of the item of jewelry.

5. The method of claim 4 wherein the item of jewelry has multiple gemstones embedded therein, and further comprising repeating steps (c)-(e) for each gemstone.

6. The method of claim 4 wherein the images comprise a series of CT scans.

7. The method of claim 4 wherein the series of images are derived from a three-dimensional image of the item.

8. A system for determining precious metal content of an item of jewelry, the item of jewelry having one or more gemstones embedded therein, the system comprising:
    a memory register for storing an image of the item of jewelry;
    a processor configured to:
        execute a programmatic edge detection process on the image determine edges of the gemstones;
        automatically selecting a shape of each of the gemstones based on the determined edges;
        determine a plurality of dimensions for each of the gemstones based on the shape and determined edges;
    calculating a volume for each of the gemstones based on the shape and dimensions;
    calculating a weight of each of the embedded gemstones by multiplying the calculated volume by a specific gravity value associated with each of the embedded gemstones; and
    calculating the precious metal content of the item of jewelry by subtracting the weight for each of the embedded gemstones from a total weight of the item of jewelry.

9. The system of claim 8 further comprising a display for displaying the image.

10. The system of claim 8 further comprising an imaging device for creating the image.

11. The system of claim 8 further comprising a scale for determining the total weight of the item of jewelry.

12. A system for determining precious metal content of an item of jewelry, the item of jewelry having a gemstone embedded therein, the system comprising:
    a memory register for storing a three-dimensional image of the item of jewelry; and
    a processor configured to:
        (a) retrieve the image of the item of jewelry from the memory register;
        (b) divide the image into a plurality of image slices, each image slice having a uniform thickness;
        (c) determine an area attributed to the gemstone within each image slice;
        (d) calculate a total volume for the gemstone by (i) calculating a slice volume for each slice by multiplying each determined area by the uniform thickness, and (ii) summing the slice volumes;
        (e) calculate a weight for the gemstone by multiplying the total volume by a specific gravity value associated with the gemstone; and
        (f) calculate the precious metal content of the item of jewelry by subtracting the weight from a total weight of the item of jewelry.

13. The system of claim 12 further comprising a display for displaying the image.

14. The system of claim 13 wherein the display further displays the weight of the gemstone.

15. The system of claim 12 further comprising an imaging device for creating the image.

16. The system of claim 12 further comprising a scale for determining the total weight of the item of jewelry.

* * * * *